United States Patent
Rauh et al.

(10) Patent No.: US 7,513,526 B2
(45) Date of Patent: Apr. 7, 2009

(54) RESTRAINING SYSTEM AND METHOD

(75) Inventors: Helmut Rauh, Munich (DE); Klaus Achatz, Gilching (DE); Marcus Weidner, Weilheim (DE); Richard Baur, Pfaffenhofen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/598,108

(22) Filed: Nov. 13, 2006

(65) Prior Publication Data

US 2007/0057494 A1 Mar. 15, 2007

Related U.S. Application Data

(63) Continuation of application No. PCT/EP2005/005096, filed on May 11, 2005.

(30) Foreign Application Priority Data

May 14, 2004 (DE) .................. 10 2004 023 973

(51) Int. Cl.
*B60R 21/001* (2006.01)

(52) U.S. Cl. .................. 280/735; 701/45; 307/10.1

(58) Field of Classification Search ............... 280/735; 701/45; 307/10.1
See application file for complete search history.

(56) References Cited

U.S. PATENT DOCUMENTS

| | | | | |
|---|---|---|---|---|
| 4,243,248 A | * | 1/1981 | Scholz et al. | 280/735 |
| 5,158,323 A | * | 10/1992 | Yamamoto et al. | 280/734 |
| 5,400,487 A | * | 3/1995 | Gioutsos et al. | 280/735 |
| 5,411,289 A | * | 5/1995 | Smith et al. | 280/735 |
| 5,460,405 A | * | 10/1995 | Faigle et al. | 280/735 |
| 5,582,428 A | * | 12/1996 | Buchanan et al. | 280/741 |
| 5,590,904 A | * | 1/1997 | Ellis et al. | 280/735 |
| 5,836,610 A | * | 11/1998 | Rink et al. | 280/736 |
| 5,868,427 A | * | 2/1999 | Mueller et al. | 280/806 |
| 5,880,534 A | * | 3/1999 | Mossi et al. | 307/10.1 |
| 5,957,490 A | * | 9/1999 | Sinnhuber | 280/735 |
| 6,036,225 A | * | 3/2000 | Foo et al. | 280/735 |

(Continued)

FOREIGN PATENT DOCUMENTS

DE 41 29 314 A1 3/1992

(Continued)

OTHER PUBLICATIONS

German Examination Report dated Nov. 15, 2004 including English translation (Nine (9) pages).

(Continued)

*Primary Examiner*—Paul N. Dickson
*Assistant Examiner*—Timothy Wilhelm
(74) *Attorney, Agent, or Firm*—Crowell & Moring LLP

(57) ABSTRACT

A restraint system, in particular for a motor vehicle, includes a restraint device, to be activated in at least two steps; a sensor unit for sensing activation-relevant vehicle and operating data; a control device for processing the activation-relevant vehicle and operating data; as well as an ignition unit for driving the actuators for activating the at least one restraining device. To increase the safety of such a restraining device, at least two independently switched ignition units are provided such that, when one ignition unit fails, the activation of the restraint device in at least one step is guaranteed by the other ignition unit.

11 Claims, 1 Drawing Sheet

U.S. PATENT DOCUMENTS

| | | | |
|---|---|---|---|
| 6,168,197 B1 * | 1/2001 | Paganini et al. | 280/735 |
| 6,199,901 B1 * | 3/2001 | Iizuka | 280/735 |
| 6,199,903 B1 * | 3/2001 | Brambilla et al. | 280/735 |
| 6,220,628 B1 * | 4/2001 | Konja | 280/735 |
| 6,286,863 B1 * | 9/2001 | Kamiji et al. | 280/736 |
| 6,288,636 B1 * | 9/2001 | Kaupp et al. | 340/438 |
| 6,295,494 B1 * | 9/2001 | Nitschke et al. | 701/45 |
| 6,304,004 B1 * | 10/2001 | Meyer et al. | 307/10.1 |
| 6,314,889 B1 * | 11/2001 | Smith | 102/530 |
| 6,536,798 B1 * | 3/2003 | Hamilton | 280/735 |
| 6,549,836 B1 * | 4/2003 | Yeh et al. | 701/45 |
| 6,566,765 B1 * | 5/2003 | Nitschke et al. | 307/10.1 |
| 6,572,142 B1 * | 6/2003 | Iyoshi et al. | 280/737 |
| 6,901,321 B1 * | 5/2005 | Nitschke et al. | 701/45 |
| 6,913,284 B2 * | 7/2005 | Haeuslmeier et al. | 280/735 |
| 6,918,611 B1 * | 7/2005 | Winters et al. | 280/735 |
| 2002/0056975 A1 * | 5/2002 | Yoon et al. | 280/735 |
| 2002/0113421 A1 * | 8/2002 | Haeuslmeier et al. | 280/741 |

FOREIGN PATENT DOCUMENTS

| | | |
|---|---|---|
| DE | 101 02 646 A1 | 8/2002 |
| EP | 1 201 512 A1 | 5/2002 |

OTHER PUBLICATIONS

International Search Report dated Aug. 2, 2005 including English translation of relevant portion (Six (6) pages).

* cited by examiner

RESTRAINING SYSTEM AND METHOD

CROSS-REFERENCE TO RELATED APPLICATIONS

This application is a continuation of PCT International Application No. PCT/EP2005/005096, filed on May 11, 2005, which claims priority under 35 U.S.C. §119 to German Application No. 10 2004 023 973.8, filed May 14, 2004, the entire disclosures of which are expressly incorporated by reference herein.

BACKGROUND AND SUMMARY OF THE INVENTION

The invention relates to a restraining system and, in particular, to a restraining system for a motor vehicle including a restraining device, which is activated in at least two stages, a sensor unit for sensing activation-relevant operating data, a control device for processing the activation-relevant operating data, and an ignition unit for driving the triggering units to activate the at least one restraining device.

Such restraining systems (which are known, for example, as an air bag system or as a seat belt system with a seat belt tightener or the like) for the protection of the occupants of a motor vehicle in the event of an accident have already become in the interim a standard feature in many vehicles. Typically, acceleration sensors, which are disposed in the vehicle, detect whether an abrupt delay of the vehicle, which is to be interpreted as a collision with an obstacle, has occurred. In the given case, an airbag in its folded state is filled, for example, with gas within a few fractions of a second by activating, or rather igniting, an ignition unit in order to intercept the body of an occupant and to avoid contact with harder parts of the vehicle.

Improved systems are in a position to fill, step-by-step, the airbag as a function of the size of the person and/or the magnitude of the accident. In this way, it is achieved that the airbag is inflated in such a manner that it is adapted to the situation (a child or an adult and/or a severe or mild accident) and that unnecessary milder injuries, caused by overfilling the airbag or filling the airbag too fast, are avoided. Such a system has already been described in the German patent document DE 101 02 646 A1.

The present invention is based on the problem of providing a restraining system that is intended for a vehicle and that ensures an improved protection of the occupants.

The invention solves this problem by providing an occupant restraint system for a motor vehicle including a restraining device, which is activated in at least two stages, a sensor unit for sensing activation-relevant operating data, a control device for processing the activation-relevant operating data, and an ignition unit for driving the triggering units to activate the at least one restraining device. At least two independently switched ignition units are provided such that if one ignition unit fails, the activation of the restraining device in at least one stage is guaranteed by the other ignition unit. The construction of the inventive restraining system, in which at least two different ignition units are assigned to each restraining device, to be activated step-by-step, for activating its different stages, ensures that, when one ignition unit fails, the restraining device (or rather each restraining device) to be activated is activated at least partly in at least one single stage by at least one other ignition unit.

In a preferred embodiment of the invention, each ignition unit exhibits a plurality of ignition end stages, whereby the individual ignition end stages are assigned to each ignition unit of a number of different restraining devices (in particular, of the same type—e.g., only airbags or only seat-belt systems). In an especially preferred embodiment, the invention relates to restraining systems in the form of airbag systems. As an alternative or in addition, however, other restraining systems, such as a seat-belt system with a seat belt tightener, are also envisioned.

Other objects, advantages and novel features of the present invention will become apparent from the following detailed description of the invention when considered in conjunction with the accompanying drawings.

DETAILED DESCRIPTION OF THE DRAWINGS

Figure 1:
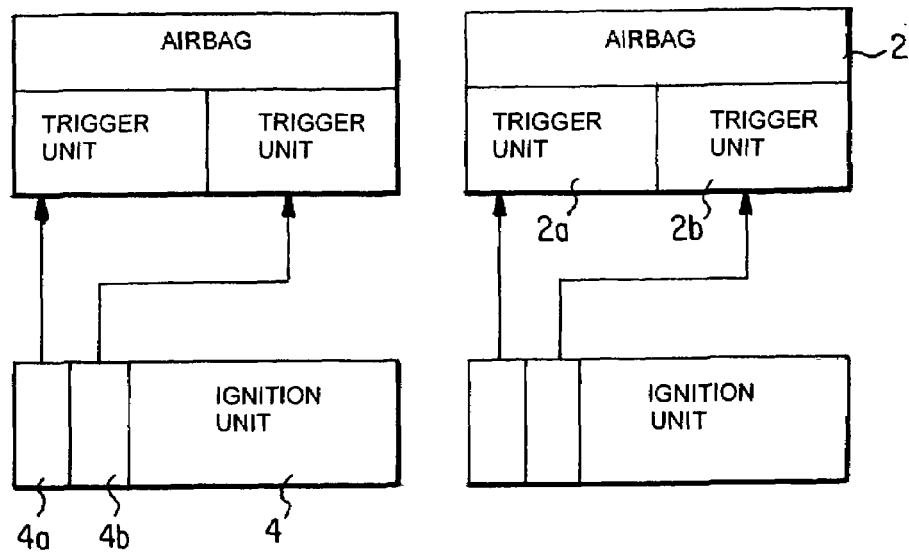
FIG. 1 is a schematic block diagram of a restraining system, according to the prior art.

The invention is explained below with reference to one example of an airbag system. According to FIG. 1, a restraining system, according to the prior art, includes a plurality of airbags 2 with pyrotechnic triggering units 2a, 2b. One possible design of the triggering units 2a, 2b is described in the above cited German patent document DE 101 02 646 A1 (having U.S. counterpart US 2002/0113421 A1, the specification, of which is incorporated by reference here in its entirety). The airbags 2 may be activated step-by-step, so that, for example, in a first stage the airbag 2 is filled up to a defined first filling capacity (e.g., 50% or 70%) and in a second stage, which may be activated independently of the first stage, the airbag continues to be filled up to a defined second filling capacity (e.g., 50% or 30%). To this end, each airbag 2 has at least two triggering units 2a, 2b. Each airbag 2 is assigned an ignition unit 4, which is constructed as an ASIC (application specific integrated circuit), with a plurality of ignition end stages 4a, 4b. Therefore, the various triggering units 2a, 2b of an airbag 2 are driven and activated by the various ignition end stages 4a, 4b of a single ignition unit 4. Furthermore, there is a control device 6, which processes the activation-relevant vehicle, personal, and/or operating data and, if certain activation and/or triggering criteria are fulfilled, generates a corresponding triggering signal to the ignition units 4 for activating the airbags 2.

The drawback is that, if an (ignition unit 4) ASIC fails, no airbag 2, assigned to this ASIC (or rather this ignition unit 4), can be activated.

Figure 2:
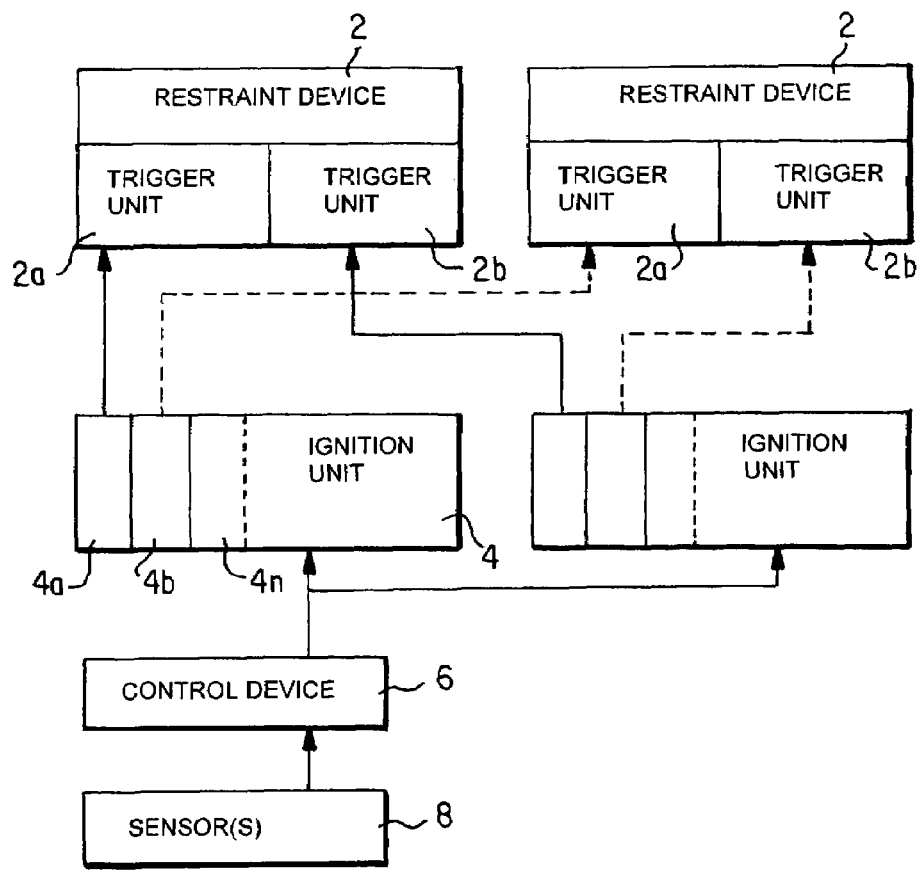
FIG. 2 is a schematic block diagram of a restraining system, according to the present invention.

FIG. 2 depicts a potential embodiment of the inventive restraint system. There are, for example, two restraining devices 2, which are constructed as airbags, with assigned and/or integrated triggering units 2a, 2b. At least two different ignition units 4 are assigned to each airbag 2, so that, if an ASIC (or rather an ignition unit 4) fails, each airbag 2 can be activated at least within the scope of one stage, and the probability of a total failure of an airbag 2 is significantly minimized. In the illustrated embodiment, each of the two triggering units 2a; 2b of each airbag 2 is assigned exactly one ignition end stage 4a (first ignition unit), 4a (second ignition unit); 4b (first ignition unit), 4b (second ignition unit) of the various ignition units 4. Even a three-stage or multi-stage design of a restraint system is possible. According to the invention, each restraint device 2 is assigned at least two different ignition units 4. Even higher reliability is guaranteed when a different ignition unit 4 is assigned to each triggering unit 2a, 2b, . . . 2n.

The ignition units 4 are driven in a conventional manner by way of a control device 6 (e.g., an airbag control device)—which evaluates the activation-relevant or rather the triggering-relevant vehicle data, personal data, and/or operating data (called in general the operating data). Preferably, the triggering-relevant operating data are: the acceleration data (vehicle acceleration in such a manner that an accident may be indicated?), belt lock data (is the safety belt on or not?), seat occupant detection data (seat occupied or not?), weight detection of the vehicle occupants, or the like. The plethora of triggering-relevant data is sensed by a widely extended sensor unit 8 in the vehicle and is fed to the control device 6 for further processing.

All of the features, described here by means of an airbag system, may be applied, of course, just as well to other restraint systems, such as the aforementioned safety belt system with a safety belt tightener.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A restraint system for a motor vehicle, comprising:
   at least two restraint devices each activatable in at least two stages;
   a control device for processing activation-relevant operating data of the vehicle;
   a sensor unit for sensing activation-relevant operating data and providing the activation-relevant operating data to the control device; and
   at least two independently switched ignition units coupled with the control device and to each of the at least two restraint devices, wherein the at least two independently switched ignition units are operably configured such that, if one ignition units fails, activation of each of the at least two restraint devices in at least one stage is performed by the other ignition unit, wherein
   each of the at least two ignition units includes two ignition end stages, the two ignition end stages of each of the at least two ignition units being electrically configured such that one ignition end stage of each ignition unit is assigned to one of the at least two restrain devices, and another ignition end stage of each ignition unit is assigned to the other of the at least two restraint devices.

2. The restraint system according to claim 1, wherein the at least two restraint devices comprise airbags.

3. The restraint system according to claim 1, wherein at least two restraint devices in the form of airbags are provided, the at least two independently switched ignition units being each provided with at least two ignition end stages, wherein the at least two independently switched ignition units are electrically coupled such that the at least two ignition end stages are assigned to one ignition unit of the various airbags.

4. The restraint system according to claim 1, wherein the at least two restraint devices comprise seatbelts having a seatbelt tightener.

5. The restraint system according to claim 4, wherein at least two restraint devices in the form of a seatbelt having a seatbelt tightener are provided, the at least two independently switched ignition units each having at least two ignition end stages, wherein the at least two independently switched ignition units are electrically coupled together such that the at least two ignition end stages are assigned to one ignition unit of the various seatbelts having seatbelt tighteners.

6. A motor vehicle restraint system, comprising:
   a two stage activated restraint device, each stage being activated by a respective triggering unit;
   first and second independently switched ignition units each connected to one of the triggering units, operably configured such that if the first ignition unit fails, the second ignition unit activates at least one stage of the two stage restraint device; and
   a second two stage restraint device,
   wherein each of the first and second ignition units includes two ignition end stages, the two ignition end stages of the first and second ignition units being electrically configured such that one ignition end stage of each ignition unit is assigned to the restraint device and another ignition end stage of each ignition unit is assigned to the second restraint device.

7. The restraint system according to claim 6, wherein the two stage restraint device is an airbag.

8. The restraint system according to claim 6, wherein the two stage restraint device is a seatbelt having a seatbelt tightener.

9. A method of operating a vehicle restraint system having a pair of two stage restraint devices, the method comprising the acts of:
   sensing in a sensor unit activation-relevant operating data of the vehicle;
   upon receiving the activation-relevant operating data in a control device of the vehicle restraint system, providing an activation signal to activate a trigger unit of at least one stage of each of the pair of restraint devices via a first ignition unit;
   upon failing to activate the trigger unit of the at least one stage of each of the pair of restraint devices, activating the trigger unit of the at least one stage thereof via a second independently switched ignition unit, and
   electrically configuring two ignition end stages of each of the first and second ignition units, such that one ignition end stage of each ignition unit is assigned to one of the pair of restraint devices, and another ignition end stage of each ignition unit is assigned to the other of the pair of restraint devices.

10. The method according to claim 9, wherein the restraint device is an airbag.

11. The method according to claim 9, wherein the restraint device is a seatbelt having a seatbelt tightener.

* * * * *